United States Patent
Kiser

(10) Patent No.: US 9,909,648 B2
(45) Date of Patent: Mar. 6, 2018

(54) ANTI-BACKLASH WORM GEAR ASSEMBLY AND MACHINING TOOL POSITION CALIBRATION DEVICE USING SAME

(71) Applicant: Mike Kiser, Bloomington, IN (US)

(72) Inventor: Mike Kiser, Bloomington, IN (US)

( * ) Notice: Subject to any disclaimer, the term of this patent is extended or adjusted under 35 U.S.C. 154(b) by 285 days.

(21) Appl. No.: 14/963,441

(22) Filed: Dec. 9, 2015

(65) Prior Publication Data

US 2017/0167571 A1 Jun. 15, 2017

(51) Int. Cl.
*G01B 5/14* (2006.01)
*F16H 1/16* (2006.01)
*F16H 57/12* (2006.01)

(52) U.S. Cl.
CPC .............. *F16H 1/16* (2013.01); *F16H 57/12* (2013.01); *G01B 5/14* (2013.01)

(58) Field of Classification Search
CPC .............. F16H 1/16; F16H 57/12; G01B 5/14
USPC .................................................... 33/645, 626
See application file for complete search history.

(56) References Cited

U.S. PATENT DOCUMENTS

| 2,877,658 | A | | 3/1959 | Anthony |
| 3,059,200 | A | | 10/1962 | Bamford |
| 3,848,477 | A | | 11/1974 | Giandinoto et al. |
| 4,295,279 | A | * | 10/1981 | Sienknecht .............. G01C 9/28 227/156 |
| 4,621,933 | A | | 11/1986 | Musso |
| 5,594,993 | A | * | 1/1997 | Tager .................. G01C 15/002 33/227 |
| 2005/0117153 | A1 | * | 6/2005 | Kishi .................. G01C 15/002 356/399 |
| 2013/0318803 | A1 | * | 12/2013 | Lokshyn ............ G01B 11/2755 33/288 |
| 2017/0167571 | A1 | * | 6/2017 | Kiser ........................ F16H 1/16 |
| 2017/0314725 | A1 | * | 11/2017 | Ozyuksel ................ F16M 7/00 |

\* cited by examiner

*Primary Examiner* — Yaritza Guadalupe-McCall
(74) *Attorney, Agent, or Firm* — Liell + McNeil

(57) ABSTRACT

A calibration device is used for calibrating a position of a cutting tool relative to a machine rotation axis, such as for setting the position of the small boring tool for a CNC machine. The device includes a body with a machine contact surface, a tool contact surface, a machine rotation axis locating surface and a worm access opening. An anti-backlash worm gear assembly is mounted in the body and includes a worm in contact with the wheel. A bubble level is attached to rotate with the wheel with respect to the body responsive to rotation of the worm. At least one anti-backlash wedge is biased into contact with the worm.

20 Claims, 4 Drawing Sheets

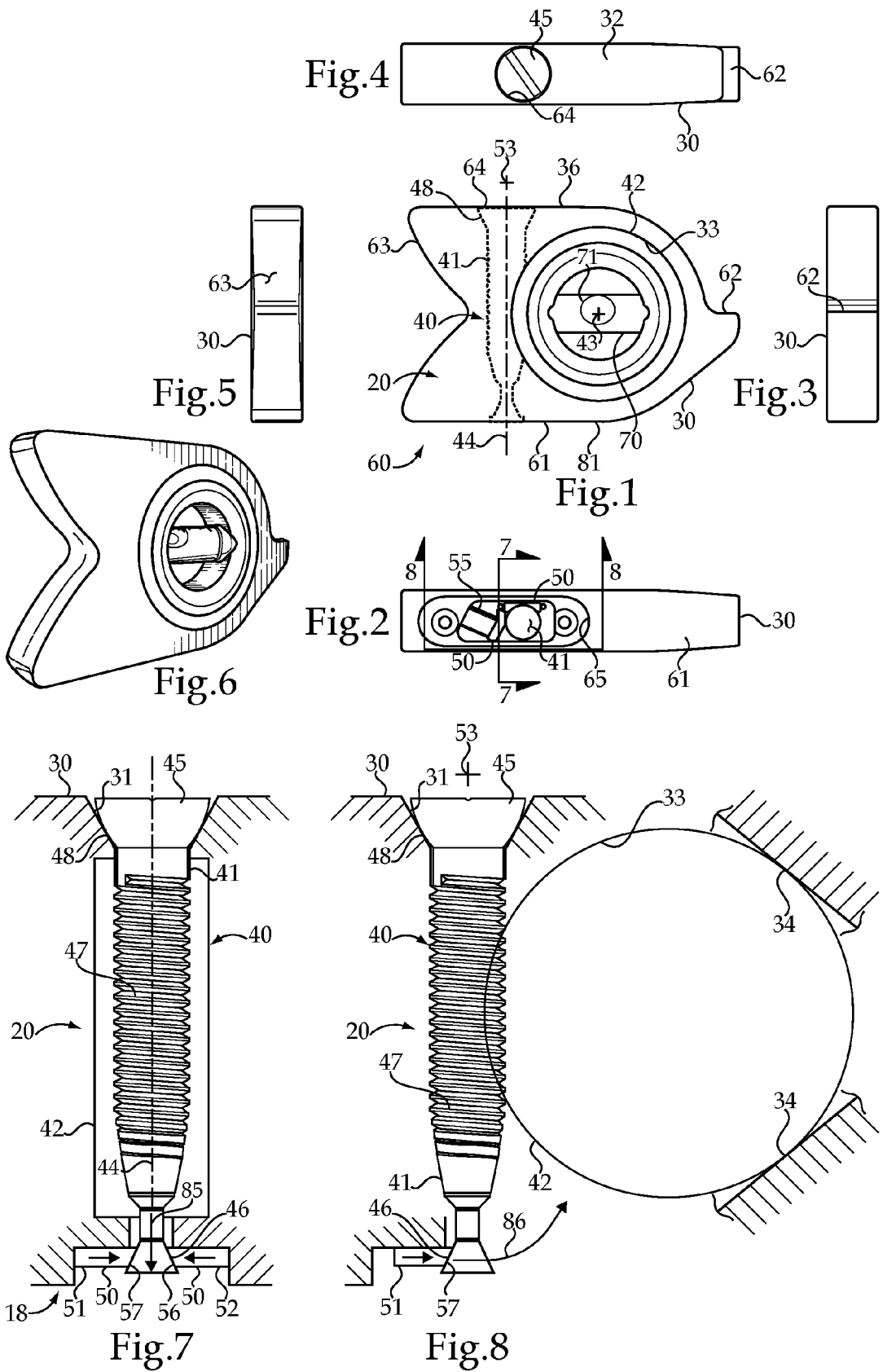

ANTI-BACKLASH WORM GEAR ASSEMBLY AND MACHINING TOOL POSITION CALIBRATION DEVICE USING SAME

TECHNICAL FIELD

The present disclosure relates generally to anti-backlash worm gear assemblies, and more particularly to a calibration device for calibrating a position of a machining tool relative to a machine workpiece rotation axis.

BACKGROUND

Worm gear assemblies have found their way into devices for many different technologies. A typical worm gear assembly includes a wheel in contact with a rotatable worm via a threaded interaction such that the wheel rotates about a wheel axis responsive to rotation of the worm about a perpendicular worm axis. In some applications, backlash in the worm gear assembly might need to be addressed. Backlash occurs when lash allows the wheel to rotate slightly back and forth about an orientation defined by the rotation position of the worm. Precisely controllable worm gear assemblies with anti-backlash features could find potential application in a wide variety of precision instruments, calibration devices and controllers, such as potentiometers.

The present disclosure is directed toward one or more of the problems set forth above.

SUMMARY

In one aspect, a calibration device for calibrating a position of a tool relative to a machine rotation axis includes a worm gear assembly mounted in a body. The body includes a machine contact surface, a tool contact surface, a machine rotation axis locating surface and a worm access opening. The worm gear assembly includes a worm in contact with a wheel. A level is attached to rotate with the wheel with respect to the body responsive to rotation of the worm. At least one anti-backlash wedge is biased into contact with the worm.

In another aspect, a method of calibrating a tool position relative to a machine rotation axis includes placing the machine contact surface of the calibration device in contact with a reference surface of the machine. The worm of the worm gear assembly is rotated until the level is at a level orientation. The calibration device is moved to position the machine rotation axis locating surface into contact with a rotation surface of the machine, and the tool contact surface into contact with a tool of the machine. A position of the tool relative to the reference surface is adjusted until the level is at the level orientation. The orientation of the worm gear assembly is maintained against backlash by biasing the anti-backlash wedge into an interaction with the worm.

In another aspect, an anti-backlash worm gear assembly includes a worm gear assembly mounted in a body, and including a worm in contact with a wheel. At least one anti-backlash wedge is at least partially positioned in the body and biased into contact with the worm to bias the worm with respect to the body along a worm axis and bias the worm about a pivot axis perpendicular to the worm axis toward contact with the wheel.

BRIEF DESCRIPTION OF THE DRAWINGS

FIG. 1 is a front view of a calibration device according to the present disclosure;

FIG. 2 is a bottom view of the calibration device of FIG. 1;

FIG. 3 is a right side view of the calibration device of FIG. 1;

FIG. 4 is a top view of the calibration device of FIG. 1;

FIG. 5 is a left side view of the calibration device of FIG. 1;

FIG. 6 is a perspective view of the calibration device of FIG. 1;

FIG. 7 is a schematic sectioned view of the anti-backlash worm gear assembly as viewed along section lines 7-7 of FIG. 2;

FIG. 8 is another schematic sectioned view of the anti-backlash worm gear assembly as viewed along section lines 8-8 of FIG. 2;

DETAILED DESCRIPTION

Figure 9:
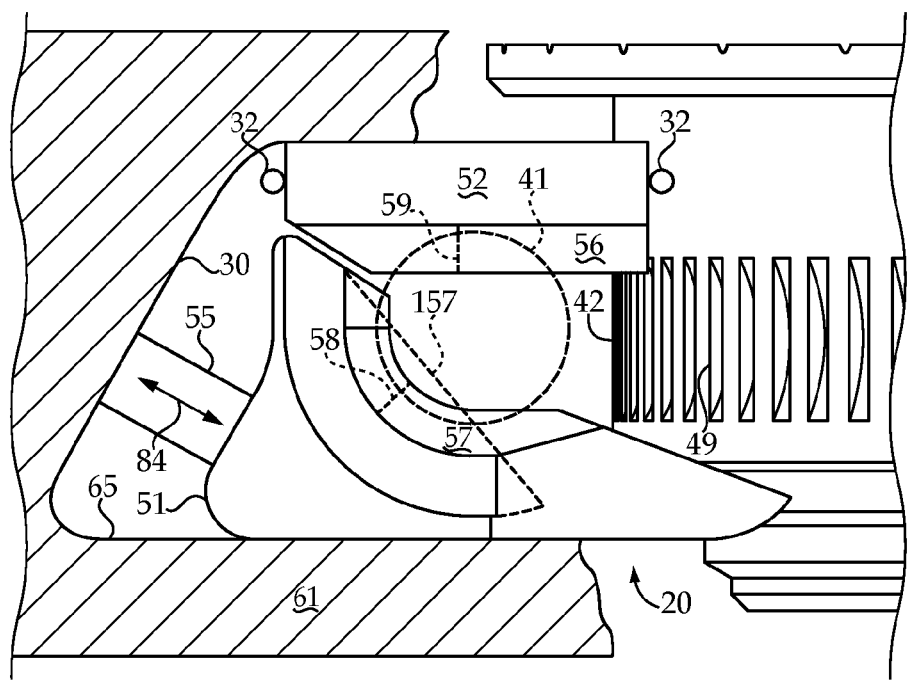
FIG. 9 is an enlarged bottom view of the calibration device of FIG. 1 except with the worm shown by hidden lines.
Figure 10:
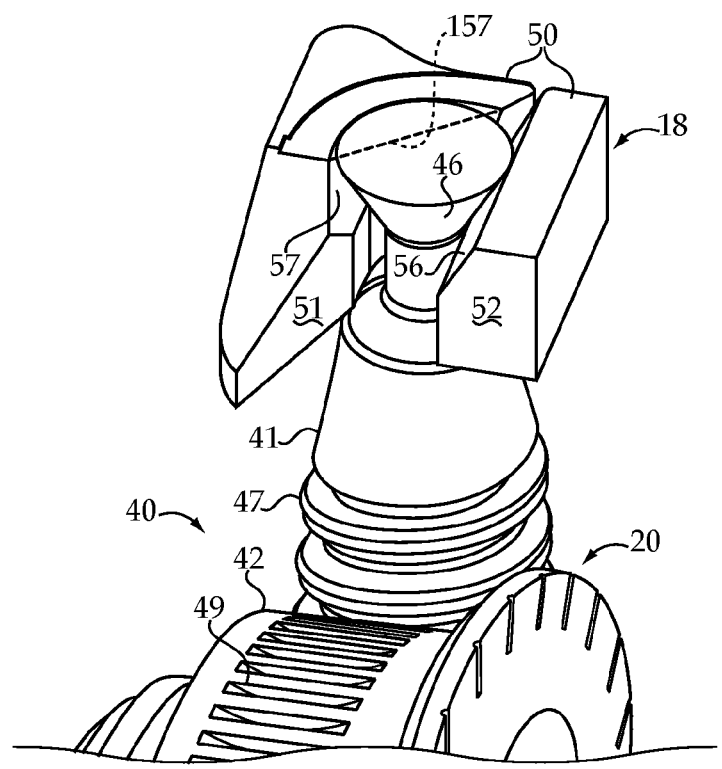
FIG. 10 is a perspective view of the interaction between the anti-backlash wedges and the worm.

Referring initially to FIGS. 1-10, a calibration device 60 may be used for calibrating a position of a machining tool relative to a machine workpiece rotation axis. For instance, calibration device 60 may be used for calibrating a position of a small boring tool relative to a work piece/machine rotation axis, such as for a computer numerical control (CNC) machine. Those skilled in the art will appreciate that good results are achieved when a cutting tool moves in or just on one side of a plane that intersects the rotation axis of a work piece being machined, depending upon the machine configuration. The quality and accuracy of the machined surface can become more sensitive to the relationship between the cutting tool and the rotation axis of the work piece as dimensions of the machined feature decrease. In addition, while many machinist can easily set up a tool position by eye and with some trial and error, accurate set up can become more difficult and problematic as tool dimensions decrease, such as for boring very tiny holes in a work piece utilizing a small boring bar. The present disclosure teaches the inclusion of an anti-backlash worm gear assembly into calibration device 60 in order to reduce uncertainty in setting up a tool and machine due to the small relative motion that can appear due to lash among moving components of a device, such as calibration device 60.

An anti-backlash worm gear assembly 20 according to the present disclosure includes a worm gear assembly 40 mounted in a body 30. The worm gear assembly 40 includes a worm 41 in contact with a wheel 42. Wheel 42 is received in a wheel bore 33 and rotates about a wheel axis 43 responsive to rotation of worm 41 about worm axis 44. As in a conventional worm gear assembly 40, worm axis 44 is oriented perpendicular to wheel axis 43. At least one anti-backlash wedge 50 is at least partially positioned in the body 30 and is biased into contact with the worm 41. The worm 41 is biased with respect to the body 30 along the worm axis 44, and the worm 41 is biased about a pivot axis 53, which is perpendicular to the worm axis 44, toward contact with the wheel 42. This bias in turn pushes the wheel 42 against bearing pads 34 positioned in wheel bore 33. Thus, wheel 42 may only effectively contact body 30 at bearing pads 34. This biasing of worm 41 along and about two different axes can effectively tighten the lash between worm 41 and wheel 42 so that little to no relative rotation of wheel 42 occurs at any given orientation defined by the positioning of worm 41.

Worm 41 has a head 45 separated from a wedge contact surface 46 by threads 47. Threads 47 are in contact with thread receiver cavities 49 defined on the outer periphery of wheel 42 in a manner well known in the art and spaced apart from one another a distance corresponding to the distance between adjacent threads in worm 41. The head 45 includes a spherical surface 48, with a center of the sphere at pivot axis 53. The spherical surface 48 is seated in a pivot surface 31 of the body 30. Pivot surface 31 should be chosen to allow some slight rotation of worm 41 about pivot axis 53. Thus, pivot surface 31 may be spherically shaped to match the spherical shape 48 of the head 45 of worm 41, or may be frustoconically shaped (as shown) without departing from the present disclosure. Those skilled in the art will appreciate that other shapes besides spherical and frustoconical could also work without departing from the present disclosure.

At least one anti-backlash wedge 50 may include a first wedge 51 and a second wedge 52 operably coupled to urge the worm 41 along the worm axis 44 as shown in FIG. 7, and pivot the worm 41 about head 45 toward the wheel 42 as shown in FIG. 8. As best shown in FIG. 9, first wedge 51 may be biased by a spring, such as a short length of compressed elastic cylinder 55, to produce a line of action biasing force 84. This biasing force urges first wedge 51 into contact with wedge contact surface 46 with wedge surface 57 having an effective line of action 58. This line of action 58 also urges wedge contact surface 46 into contact with wedge surface 56 of second wedge 52 along a line of action 59. Although first wedge 51 may be free to slide within a wedge access opening 65, second wedge 52 may be fixed with regard to body 30, such as by mounting a pair of pins 32 in body 30 contact with opposite ends of second wedge 52. The interaction 18 of first wedge 51 and second wedge 52 with worm 41 together results in a axial biasing force 85 along worm axis 44 as shown in FIG. 7. In addition, the first wedge 51 simultaneously induces a pivot torque bias 86 about pivot axis 53 to bias worm 41 toward contact with wheel 42. Thus, the arrangement of the wedges 51 and 52 in relation to wedge contact surface 46 of worm 41 results in biasing force 84 being transferred into axial biasing force 85 and pivot torque bias 86. Worm 41 is biased to rotate about pivot axis 53 where head 45 contacts frustoconical surface 31. The strength of biasing force 84 may be chosen to keep worm 41 and wheel 42 tight against relative movement, but not so tight as to inhibit rotation of either worm 41 or wheel 42 about their respective axes. The wedge contact surface 46 may have a slope angle that matches the slope of wedge surfaces 56 and 57 so that contact between wedge contact surface 46 occurs along the lines of action 58 and 59, rather than at a point. However, those skilled in the art will appreciate that other relative geometries between wedge contact surface 46 and the wedges 51 and 52 could also work as indicated and would also fall within the intended scope of the present disclosure. In addition, wedge 51 is shown as having a curved wedge surface 57, but a slanted uncurved wedge surface 157 (dashed lines FIGS. 9, 10) could be substituted without departing from this disclosure. Wedge surface 56 could be curved instead of straight as shown.

Body 30 of calibration device 60 can be thought of as including a machine contact surface 61, a tool contact surface 62, a machine rotation axis locating surface 63 and a worm access opening 64. A bubble level 70 is attached to rotate with the wheel 42 with respect to body 30 responsive to rotation of the worm 41. Bubble level 70 is typical in that it includes a bubble 71 positioned in a liquid to move relative to a level indicator 72. An electronic level or other level could be substituted for bubble level 70 without departing from the present disclosure. The machine contact surface 61 may define a first plane 81, and the tool contact surface 62 may define a second plane 82 that is parallel to and spaced from the first plane 81. The tool contact surface 62 and the machine contact surface 61 may face in opposite directions. The second plane 82 may bisect a center 66 of the machine rotation axis locating surface 63, and may also pass through the wheel axis 43. The worm axis opening 64 may be located on a side 32 of body 30 opposite from the machine contact surface 61. In the illustrated embodiment, the head 45 of worm 41 includes a conventional slot (FIG. 4) for rotating worm 41 with a conventional screw driver (not shown). The machine rotation axis locating surface 63 may include at least one of an arc of a circle or some other curve, or a V-shape or an involute shape in order to accommodate contact with a wide variety of different radii associated with a machine rotation axis. An involute shape is shown. Although not necessary, body 30 may be magnetized (see "S" and "N" in FIG. 11) to facilitate magnetic attachment of calibration device 60 to a suitable ferromagnetic surface, such as a surface on a machine with which calibration device 60 is being used.

INDUSTRIAL APPLICABILITY

The anti-backlash worm gear assembly of the present disclosure can find potential application in a wide variety of different devices, including application where worm gear assemblies are currently utilized. The anti-backlash worm gear assembly of the present disclosure finds specific application to calibration devices, precision instruments, potentiometers and other devices where even a small amount of relative movement from backlash can undermine performance. Finally, the anti-backlash worm gear assembly can find specific application in a calibration device that may be used for adjusting a tool position relative to a machine rotation axis, such as in a CNC or manual machine.

Figure 11:
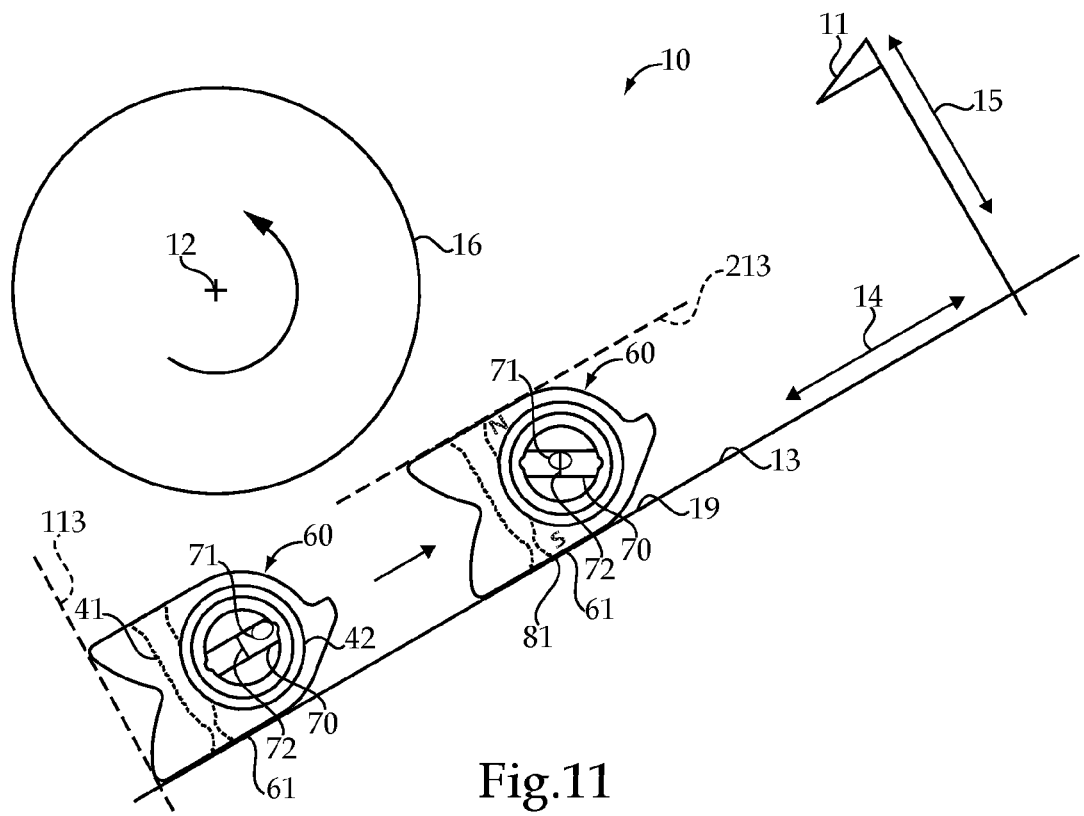
FIG. 11 is a schematic view of a portion of a calibration procedure according to the present disclosure.
Figure 12:
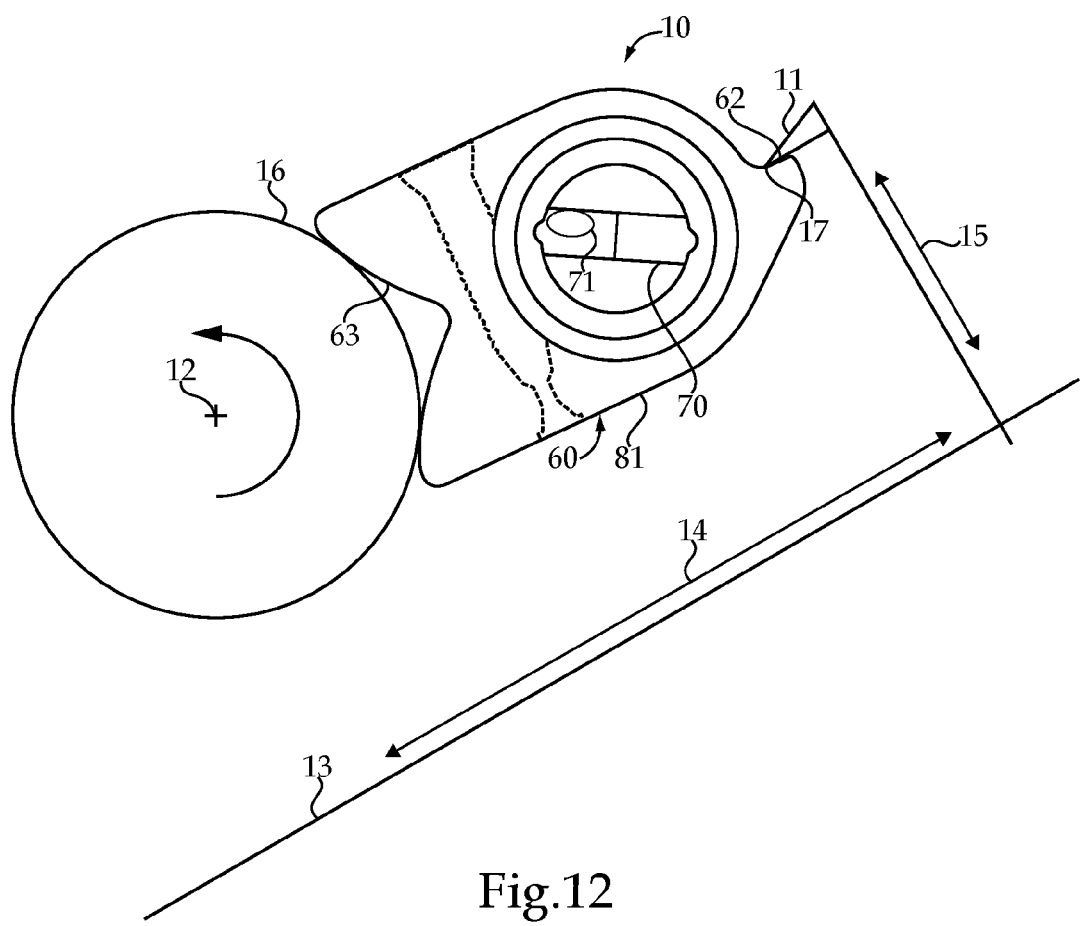
FIG. 12 schematically shows another portion of the calibration procedure.
Figure 13:
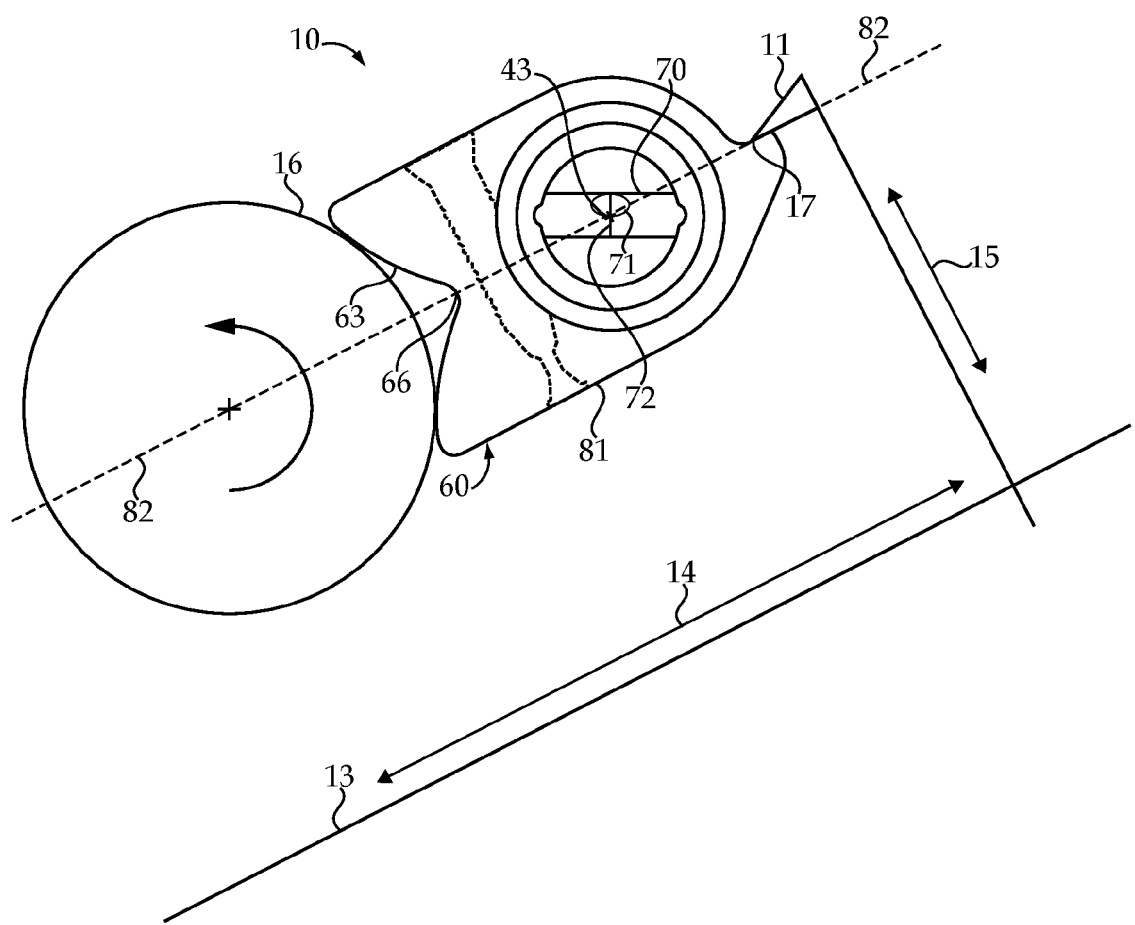
FIG. 13 schematically shows still another portion of the calibration procedure.

Referring now in addition to FIGS. 11-13. A method of using a calibration device 60 for adjusting a position of a cutting tool 11 along an adjustment line 15 relative to a machine rotation axis 12 of a CNC machine 10. The CNC machine 10 may include a reference surface 13 that defines a plane that defines control directions 14 that the machine may move tool 11 relative to a work piece rotating about machine axis 12 responsive to control instructions in a manner well known in the art. The fact that reference surface 13 is angled with respect to the horizontal, may help facilitate movement of cutting debris from a work piece to a collection location below and not shown. Other reference surfaces 113 (perpendicular) or 213 (parallel) could be utilized without departing from the present disclosure. (See FIG. 11)

The process of calibrating the position of tool 11 may begin by placing the machine contact surface 61 of the calibration device 60 into contact with the reference surface 13 of machine 10. Next, the worm 41 of the worm gear assembly 40 is rotated until the bubble level 70 is at a level orientation. As used in the present disclosure, the term "level orientation" means that level indicator 72 intersects bubble 71, in the case of a bubble level. In other bubble levels, a "level orientation" means that the bubble is between two lines but not intersected by either. FIG. 11 shows calibration device 60 before and after bubble level 70 has been adjusted. Next, as shown in FIG. 12, the calibration device 60 is moved to position the machine rotation axis locating surface 63 into contact with a rotation surface 16 of the machine 10, and the tool contact surface 62 into contact with the tool 11 of the machine 10. Preferably, the tool contact surface 62 is placed into contact with a cutting surface 17 of tool 11. Next, the position of the tool 11 relative to the reference surface 13 is adjusted until the bubble level 70 is again at the level orientation. When this is accomplished as shown in FIG. 13, the cutting edge 17 of the tool 11 will interact with a work piece rotated by machine 10 along the rotation axis 12. In general, the cutting surface tool 11 should be at or maybe slightly above or below (depending on the machine configuration) the plane intersecting the rotation axis 12 in order to achieve the best machining results. The orientation of the worm gear assembly 40 is maintained against backlash by biasing the anti-backlash wedges 50 into an interaction 18 with the worm 41, as described earlier. After properly adjusting the position of tool 11 along adjustment line 15, a machining operating using machine 10 can proceed to machine a workpiece with tool 11 in a manner well known in the art.

The present description is for illustrative purposes only, and should not be construed to narrow the breadth of the present disclosure in any way. Thus, those skilled in the art will appreciate that various modification might be made to the presently disclosed embodiments without departing from the full and fair scope and spirit of the present disclosure. Other aspects, features and advantages will be apparent upon an examination of the attached drawings and appended claims.

What is claimed is:

1. A calibration device for calibrating a position of a tool relative to a machine rotation axis comprising:
    a body with a machine contact surface, a tool contact surface, a machine rotation axis locating surface and a worm access opening;
    a worm gear assembly mounted in the body and including a worm in contact with a wheel;
    a level attached to rotate with the wheel with respect to the body responsive to rotation of the worm;
    at least one anti-backlash wedge biased into contact with the worm.

2. The calibration device of claim 1 wherein the machine contact surface defines a first plane.

3. The calibration device of claim 2 wherein the tool contact surface defines a second plane that is parallel to and spaced from the first plane; and
    the tool contact surface and the machine contact surface face in opposite directions.

4. The calibration device of claim 3 wherein the second plane intersects a center of the machine rotation axis locating surface.

5. The calibration device of claim 1 wherein the worm access opening is located on a side of the body opposite to the machine contact surface.

6. The calibration device of claim 1 wherein the worm has a head separated from a wedge contact surface by threads.

7. The calibration device of claim 6 wherein the wedge contact surface is frustoconically shaped.

8. The calibration device of claim 1 wherein the wheel rotates about a wheel axis that lies in a plane defined by the tool contact surface.

9. The calibration device of claim 1 wherein the at least one wedge includes a first wedge and a second wedge operably coupled to urge the worm along a worm axis and pivot the worm about the head toward the wheel.

10. The calibration device of claim 9 wherein the head includes spherical surface seated in a pivot surface of the body; and
    the pivot surface is one of spherically shaped and frustoconically shaped.

11. The calibration device of claim 1 wherein the machine rotation axis locating surface has at least one of a V-shape and an involute shape.

12. The calibration device of claim 1 wherein the body is magnetized for magnetic attachment of the calibration device to a ferromagnetic surface.

13. The calibration device of claim 1 wherein the wheel is received in a wheel bore defined by the body and contacts the body at first and second bearing pads.

14. A method of calibrating a tool position relative to a machine rotation axis with a calibration device that includes a body with a machine contact surface, a tool contact surface, a machine rotation axis locating surface and a worm access opening; a worm gear assembly mounted in the body and including a worm in contact with a wheel; a level attached to rotate with the wheel with respect to the body responsive to rotation of the worm; at least one anti-backlash wedge biased into contact with the worm, the method comprising the steps of:
    placing the machine contact surface of the calibration device in contact with a reference surface of a machine;
    rotating the worm of the worm gear assembly until the level is at a level orientation;
    moving the calibration device to position the machine rotation axis locating surface into contact with a rotation surface of the machine, and the tool contact surface into contact with a tool of the machine;
    adjusting a position of the tool relative to the reference surface until the level is at the level orientation; and
    maintaining an orientation of the worm gear assembly against backlash by biasing the anti-backlash wedge into an interaction with the worm.

15. The method of claim 14 wherein the adjusting step includes adjusting a distance of a cutting surface of the tool along a line perpendicular to the reference surface.

16. An anti-backlash worm gear assembly comprising:
    a body;
    a worm gear assembly mounted in the body and including a worm in contact with a wheel; and
    at least one anti-backlash wedge at least partially positioned in the body and biased into contact with the worm to bias the worm with respect to the body along a worm axis, and bias the worm about a pivot axis perpendicular to the worm axis toward contact with the wheel.

17. The anti-backlash worm gear assembly of claim 16 wherein the worm has a head separated from a wedge contact surface by threads;
    the head includes spherical surface seated in a pivot surface of the body; and
    the pivot surface is one of spherically shaped and frustoconically shaped.

18. The anti-backlash worm gear assembly of claim 17 wherein the at least one wedge includes a first wedge and a second wedge operably coupled to urge the worm along the worm axis and pivot the worm about the head toward the wheel.

19. The anti-backlash worm gear assembly of claim 18 wherein the wedge contact surface is frustoconically shaped.

20. The anti-back lash worm gear assembly of claim 19 wherein the wheel is received in a wheel bore of the body, and contacts the body at first and second bearing pads.

\* \* \* \* \*